C. ANDEEN.
TOOTHED HARROW.
APPLICATION FILED MAY 29, 1920.
1,438,513.
Patented Dec. 12, 1922.
2 SHEETS—SHEET 1.
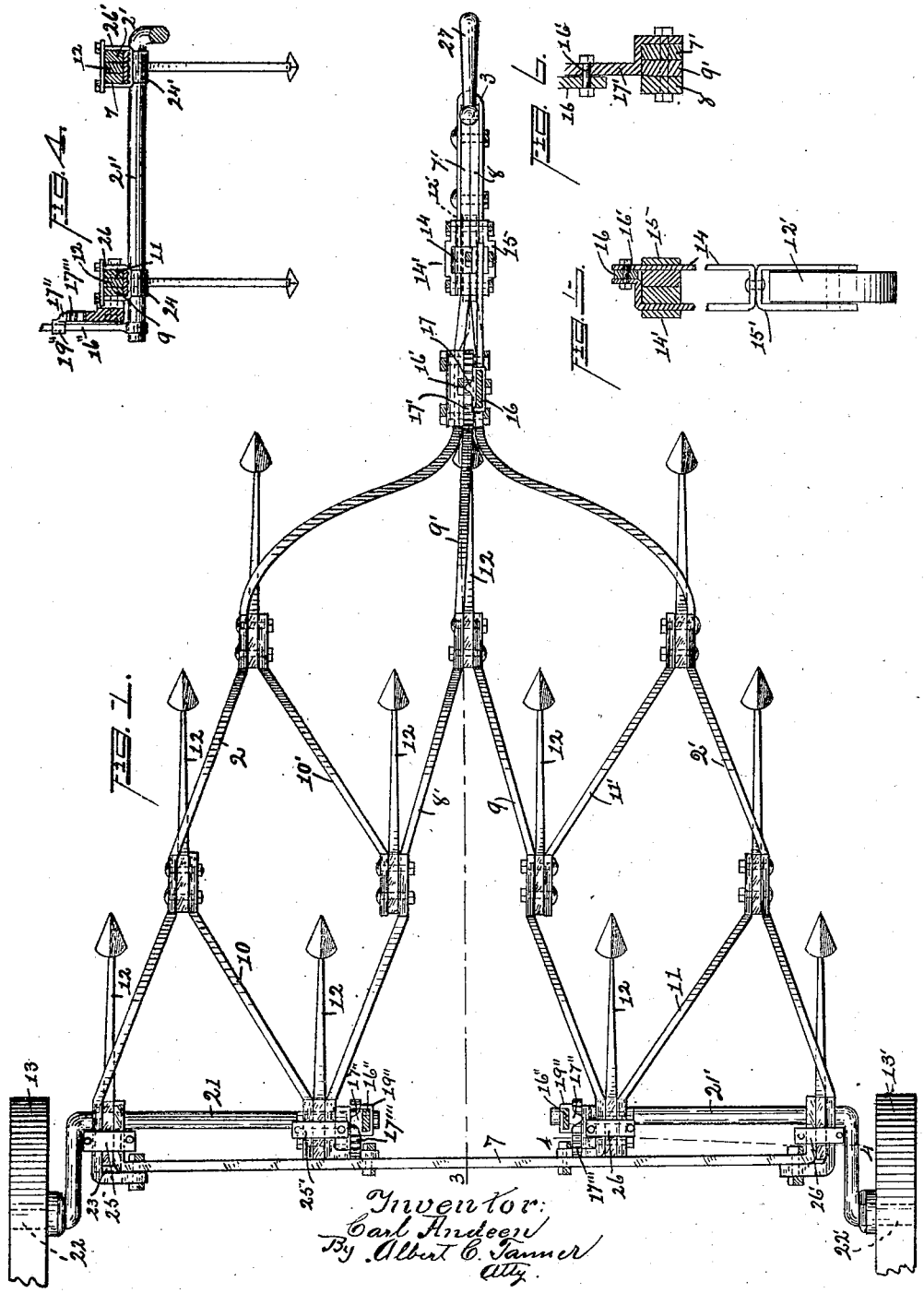

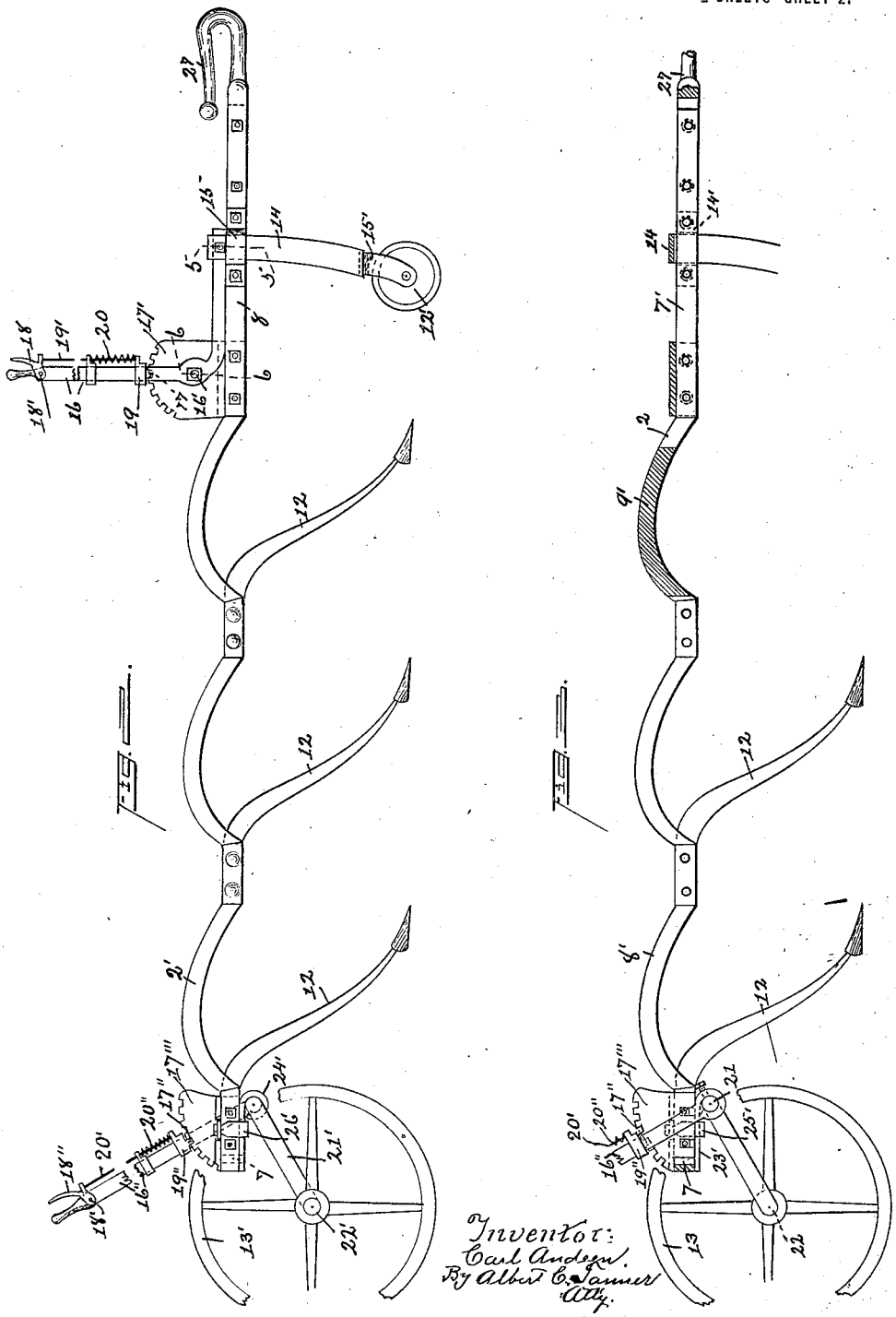

Patented Dec. 12, 1922.

1,438,513

UNITED STATES PATENT OFFICE.

CARL ANDEEN, OF HADDAM, CONNECTICUT.

TOOTHED HARROW.

Application filed May 29, 1920. Serial No. 385,141.

*To all whom it may concern:*

Be it known that I, CARL ANDEEN, a citizen of the United States, and a resident of Higganum, in the town of Haddam, county of Middlesex, and State of Connecticut, have invented certain new and useful Improvements in Toothed Harrows, which improvements are fully set forth in the following specification.

This invention relates to improvements in soil-agitating implements of that class commonly known as toothed harrows; and its object is to provide a toothed harrow which shall be comparatively inexpensive as regards its construction; durable, efficient and reliable in practical service; convenient in its application to practical purposes; and which shall possess certain well-defined advantages over prior analogous constructions.

The invention consists in the combinations, details and parts, to be hereinafter more particularly referred to and set forth in the claims hereto appended, and whereby the attainment of the foregoing object is rendered practicable.

The invention is clearly illustrated in the accompanying drawings, wherein:

Fig. 1 is a plan view of a toothed harrow embodying my said improvements, the hand-levers shown in cross-section.

Fig. 2 is a side elevation of same.

Fig. 3 is a central, vertical, longitudinal section, as along the dotted line 3—3 of Fig. 1.

Fig. 4 is a central, vertical, transverse section, as along the dotted line 4—4 of Fig. 1.

Fig. 5 is an enlarged detail sectional view, the section being taken vertically and transversely, as along the dotted line 5—5 of Fig. 2.

Fig. 6 is a view similar to Fig. 5, the section being taken as along the dotted line 6—6 of Fig. 2.

Having reference to the accompanying drawings, wherein similar reference-numerals denote like parts throughout the several views, I, in carrying out my present invention, make use of a sectional frame which consists in part of opposite side-members 2, 2′, and a rear, transverse tie-member 7, the side-members having a general convergence forwardly and affording close-lying, advance terminals 7′, 8, respectively, said several frame members being duly connected, and in a manner to be hereinafter more fully explained.

8′ 9 are connected medial members, complementary in the main to the side-members aforenamed, one thereof having a forward extension 9′ whose advance end-portion is clamped between the terminals 7′, 8; and 10, 10′ are minor, intermediate tie-members interposed obliquely between and connecting the frame members 2, 8′, and 11, 11′ are like minor, intermediate tie-members interposed obliquely between and connecting the frame members 9, 2′.

The several frame members aforenamed are formed from flat stock, as iron or steel, and the general frame formed thereby when assembled, is fitted with a plurality of teeth 12, here shown as being firmly clamped, one at each upper end-portion thereof between each of the opposite terminals of each of the minor, intermediate tie-members aforenamed, and the frame members connected thereby, said teeth projecting, by preference, each downwardly and forwardly from its point of connection with said general frame, and being formed from any suitable material, as iron or steel.

To preserve the symmetry of the disposition of the several teeth made use of, and to further enhance the efficiency of the harrow in practical service, an additional tooth 12 is best provided, the same being clamped at its upper end-portion between the medial members 8′, 9, at the advance, converging end-portions thereof; and the clamping in position of all of the teeth made use of, may be effected by means of any appropriate elements, as bolts and nuts employed substantially as illustrated in the accompanying drawings.

To facilitate the transportation of the harrow from point to point and incidentally the adjustment of its teeth relatively to the soil thereunder, I provide the same with a front carrying-wheel 12′ and a pair of opposite, rear carrying-wheels 13, 13′; and I contemplate that each of said carrying-wheels shall be adjustable relatively to the frame of the harrow, and in such a manner as to enable the user of the harrow to readily so adjust its frame as to cause the teeth carried thereby to enter to variant depths the soil thereunder, for soil-agitating purposes, or to readily so reversely adjust said frame as to cause the teeth carried thereby to be withdrawn from, and well elevated above, the soil thereunder, the latter adjustment of the parts being resorted to when transportation of the harrow from point to point, as above mentioned, is desired.

Accordingly, I provide a yoke 14, here shown as having the general form of the letter U, straddling the connected terminals 7' 8, and operating vertically in opposite guides 14' 15, bolted to said connected terminals at the opposite sides thereof, and the carrying-wheel 12' being best swiveled thereto, at its lower end, after the manner of a caster, and through the medium of an appropriate stock 15'.

Naturally, the forward portion of the harrow may be permitted to descend relatively to the yoke 14 to cause the teeth carried thereby to engage or enter the soil thereunder, or may be elevated relatively to said yoke to withdraw such teeth from the soil thereunder, such adjustments of the parts now under consideration being controlled, in the one instance and manually effected by the user in the other instance, through the medium, as here shown, of a suitable hand-lever 16, fulcrumed at 16' and engaging, pivotally by preference, at its advance end the yoke 14 at the upper extremity thereof.

The hand-lever 16 is provided with the usual dog 17, disposed for co-operation with the customary toothed sector 17', the latter positioned at or between the terminals 7', 8, and held in place by suitable bolts and nuts, substantially as shown.

The withdrawal of the dog 17 from engagement with any tooth of the sector 17', to release the forward portion of the harrow for adjustment downwardly or upwardly relatively to the yoke 14, is facilitated through the medium of a suitable finger-piece 18, operating on a pivot 18', in the usual manner.

The dog aforenamed is here shown as being formed on a suitable slide 19, working on the hand-lever 16, and between which and said finger-piece there is interposed a connection 19', said slide thus connected to the finger-piece being urged yieldingly downward along the hand-lever by means of a suitable spring 20, and so as to cause the dog 17 to lockingly engage some one of the teeth of the sector 17', whereby the forward portion of the harrow is held under variant adjustments relatively to the yoke 14, as hereinbefore alluded to, the hand-lever 16 being properly manipulated to this end.

At the opposite rear corner-portions of the general frame of the harrow there are mounted, axially alined, rock-shafts, 21, 21', provided, respectively, with eccentric spindles 22, 22', on which rotate, respectively, the rear carrying-wheels 13, 13', said shafts being mounted to rock in suitable bearings 23, 23', 24, 24', held in place, as by clips 25, 25', 26, 26'.

Hence, the carrying-wheels 13, 13' being mounted eccentrically to the shaft with which the same co-operates, upon either of said shafts being duly rocked the corner-portion of the general frame of the harrow whereat said shaft is located will be raised or lowered, for a corresponding adjustment of the teeth thereat, relatively, to the soil thereunder, as hereinbefore explained in connection with the yoke 14, and according to the direction in which such shaft shall be rocked, as will be readily understood.

To facilitate the rocking of the shafts 21, 21', as and for the purpose above mentioned, hand-levers 16'' are fixedly mounted thereon, preferably at the inner ends thereof, respectively, each of said hand-levers having associated therewith a slide 19'', having a dog 17'' formed thereon, a finger-piece 18'', connection 20', spring 20'' for co-operation in a manner similar to that explained in connection with the hand-lever provided for co-operation with the yoke 14, save that instead of either of the hand-levers provided for co-operation with the rock-shafts of the harrow, operating on a fulcrum, as 16', provided for the front hand-lever 16, each is fixedly mounted on the shaft with which it co-operates and is hence rockable as a unit therewith, a toothed sector 17'' similar to 17' being fixedly mounted, as through the medium of suitable bolts and nuts as shown, alongside of each of the hand-levers last referred to for locking co-operation with the dog afforded thereby, as and for the purpose hereinbefore explained.

It will be seen that with the parts assembled as herein contemplated, the front portion of the general frame may be readily raised or lowered, together with the teeth carried more immediately thereby, and that either rear corner-portion of the general frame, together with the teeth more immediately carried thereby, may be correspondingly raised or lowered, all at the will of the user; while the entire general frame of the harrow, including the teeth carried thereby, may be uniformly lowered to cause the teeth of the harrow to engage or variantly enter the soil thereunder, or uniformly raised to withdraw the teeth of the harrow from the soil thereunder, and particularly when it is desired to transport the the harrow on its own carrying-wheels from one point to another.

It is best that more or less of the frame members be arched edgewise upwardly in advance of the teeth, respectively, of the harrow, substantially as shown, to minimize any tendency to clogging of the teeth; and naturally the harrow is fitted at its forward portion with a suitable clevis 27, for a purpose clearly apparent.

The harrow may be produced at a moderate cost, is strong, durable and markedly efficient as an implement for soil-agitating purposes; and it will be seen that the same is in other ways well adapted for the purposes for which it is intended. It will be further seen that the same may be modified to a considerable extent without material departure being made from the spirit and principle of my invention, as set forth in and coming within the scope of the claims hereto appended.

Having thus described my invention, I claim:

1. A harrow comprising a general frame consisting of opposite, forwardly-converging side-members; similar medial members; and minor tie-members, the latter disposed intermediate the respective side-members and the medial members associated, respectively, therewith, and firmly connecting the same, said frame fitted with a plurality of teeth clamped, respectively, between each of the tie-members and the side-member and medial member connected thereby.

2. A harrow comprising a general frame consisting of opposite, forwardly-converging side-members; similar medial members, and minor tie-members, the latter disposed intermediate the respective side-members and the medial members associated, respectively, therewith and firmly connecting the same, said frame fitted with a plurality of teeth clamped, respectively, between each of the tie-members and the side-member and medial member connected thereby, and each frame member projecting forwardly beyond any of the teeth being arched upwardly immediately in advance thereof.

CARL ANDEEN.